Figure 3:
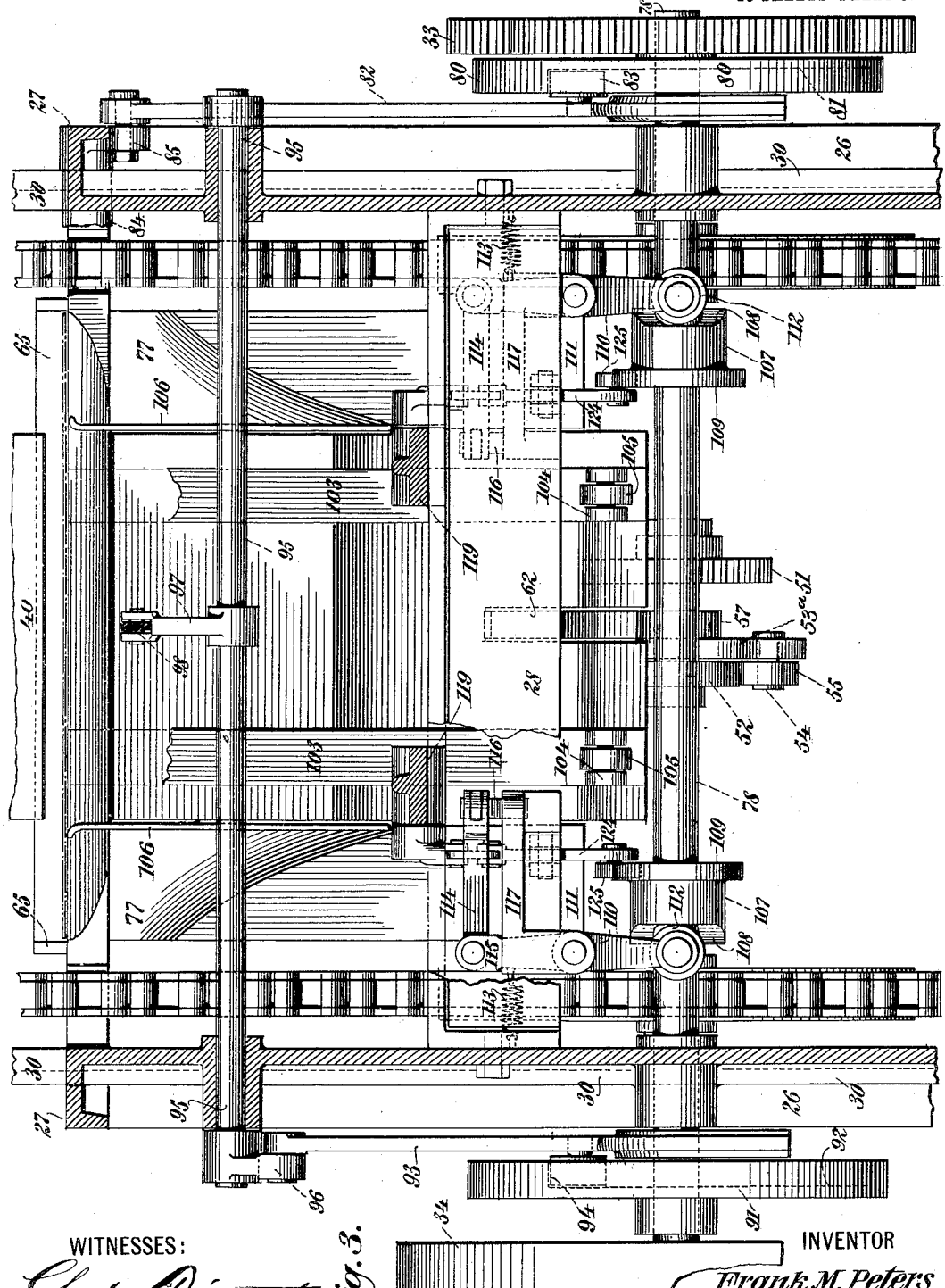

F. M. PETERS.
MACHINE FOR SETTING UP CARTONS AND THE LIKE.
APPLICATION FILED APR. 4, 1908.
1,025,880.
Patented May 7, 1912.
13 SHEETS—SHEET 1.
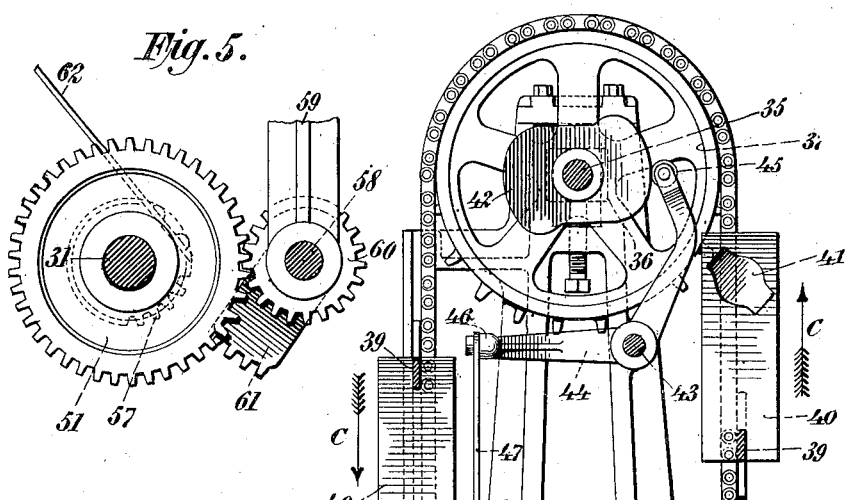
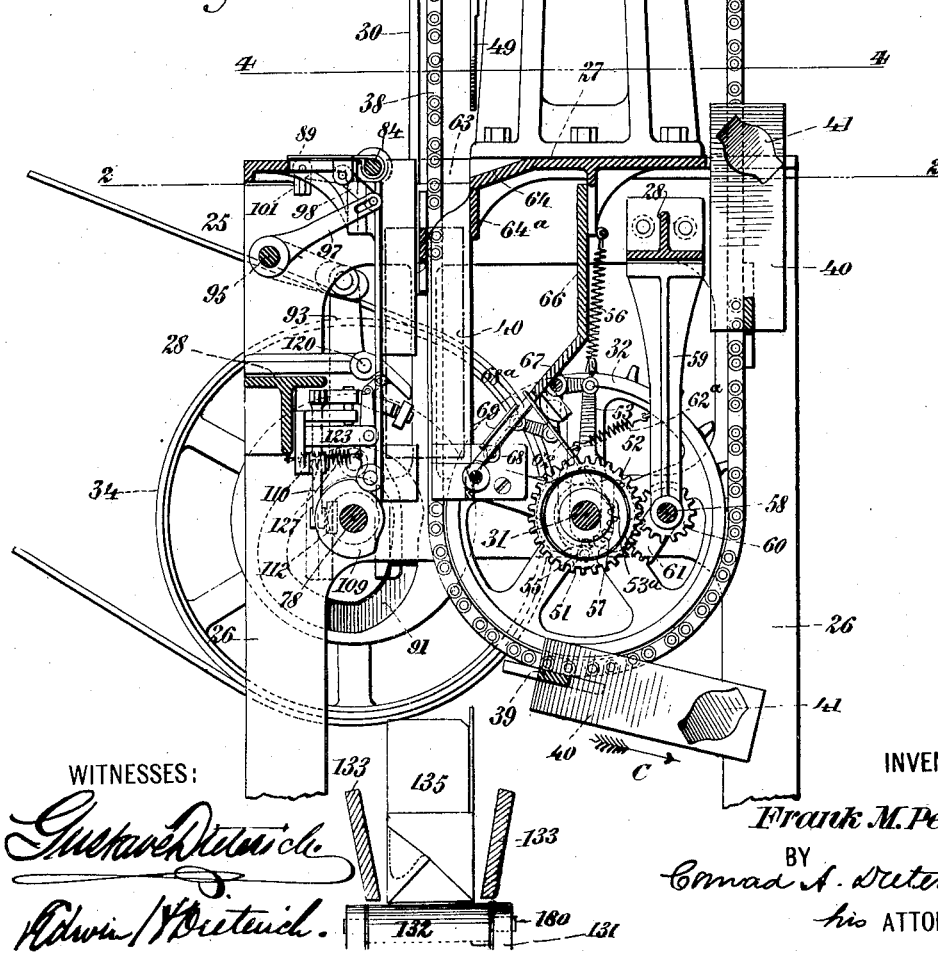
WITNESSES:
Gustave Dieterich
Edwin V Dieterich
INVENTOR
Frank M. Peters
BY
Conrad A. Dieterich
his ATTORNEY

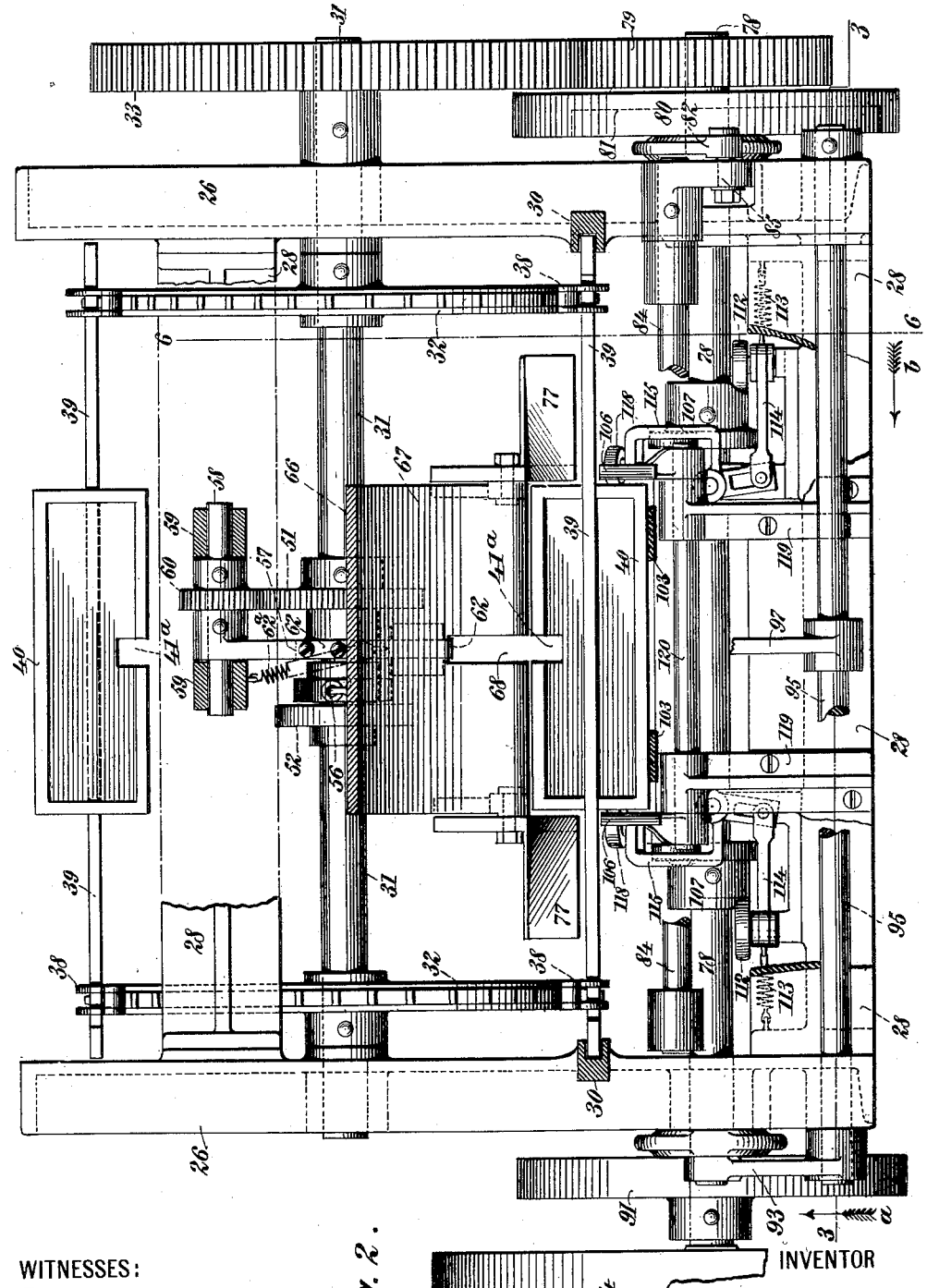

F. M. PETERS.
MACHINE FOR SETTING UP CARTONS AND THE LIKE.
APPLICATION FILED APR. 4, 1908.

1,025,880.

Patented May 7, 1912.

13 SHEETS—SHEET 4.

WITNESSES:

INVENTOR
Frank M. Peters
BY
his ATTORNEY

F. M. PETERS.
MACHINE FOR SETTING UP CARTONS AND THE LIKE.
APPLICATION FILED APR. 4, 1908.

1,025,880.

Patented May 7, 1912.

13 SHEETS—SHEET 6.

WITNESSES:

INVENTOR
Frank M. Peters
BY
his ATTORNEY

F. M. PETERS.
MACHINE FOR SETTING UP CARTONS AND THE LIKE.
APPLICATION FILED APR. 4, 1908.
1,025,880.
Patented May 7, 1912.
13 SHEETS—SHEET 7.
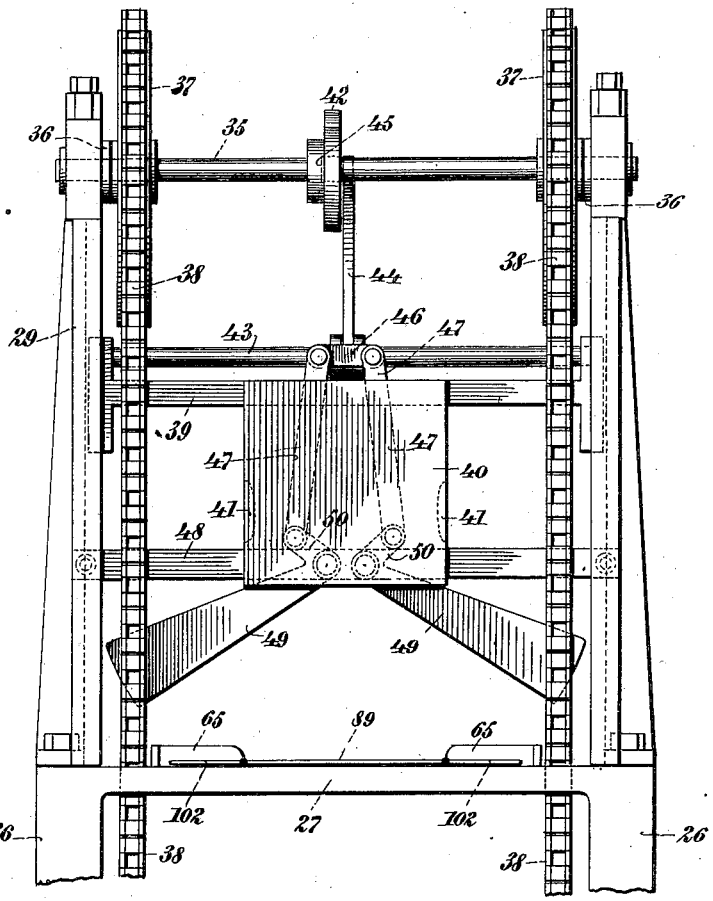
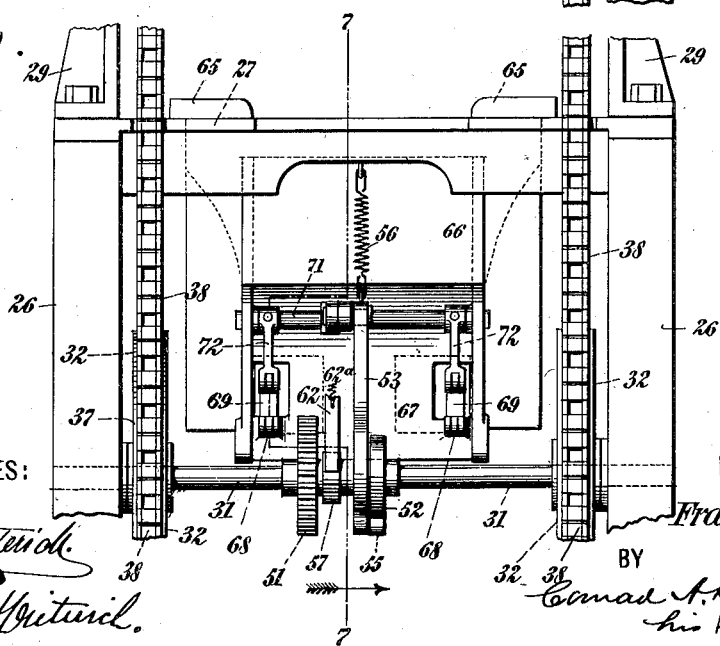

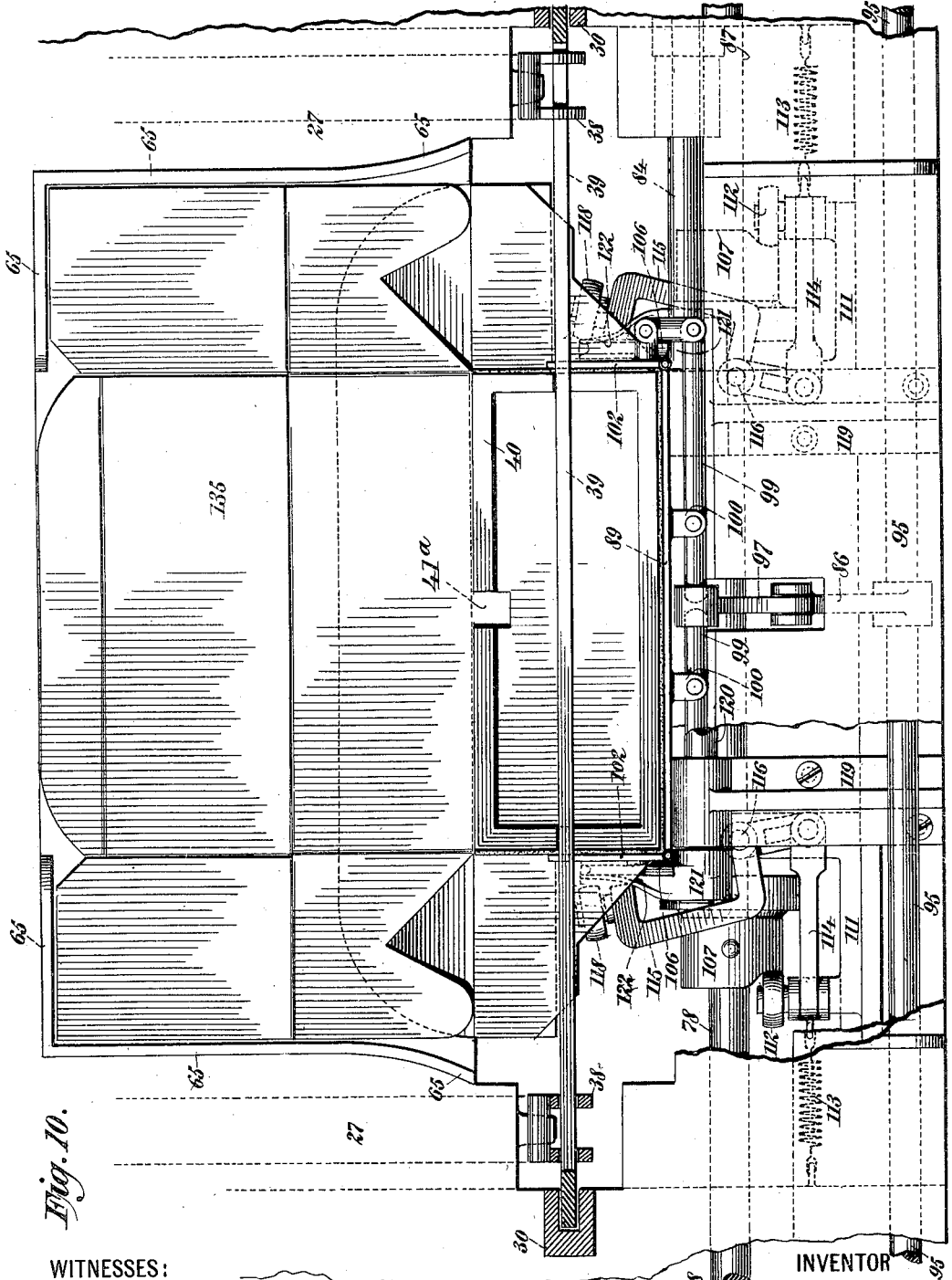

F. M. PETERS.
MACHINE FOR SETTING UP CARTONS AND THE LIKE.
APPLICATION FILED APR. 4, 1908.
1,025,880.
Patented May 7, 1912.
13 SHEETS—SHEET 9.
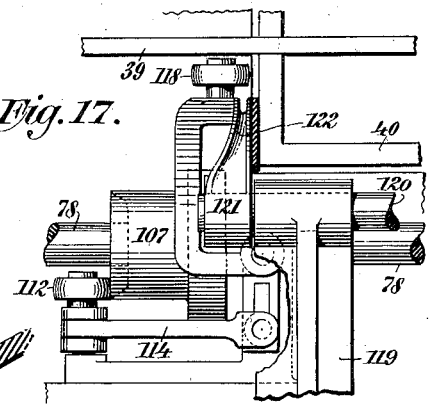
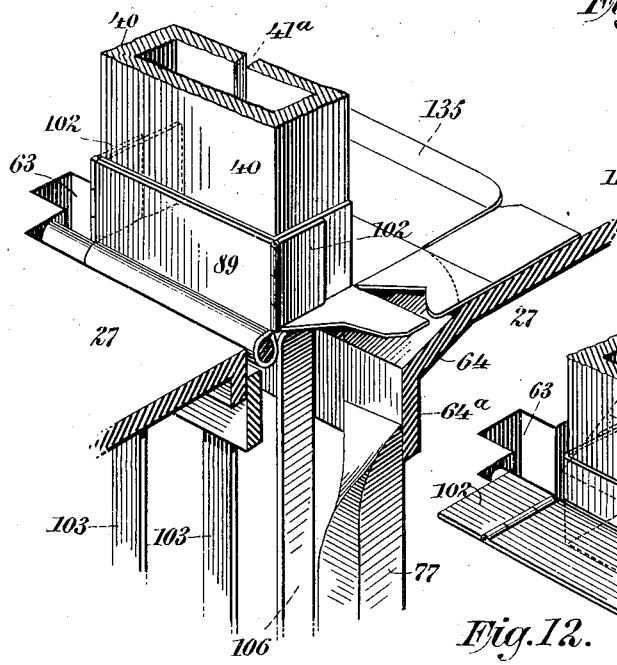
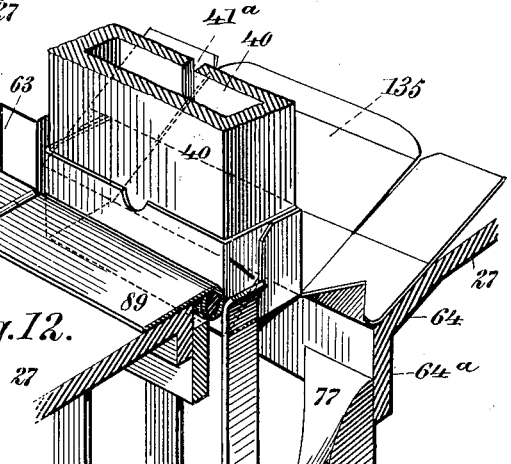
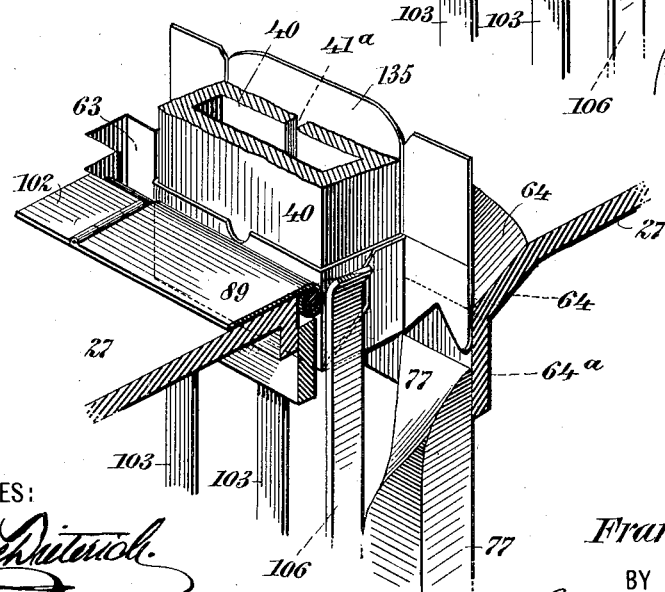
WITNESSES:
INVENTOR
Frank M. Peters
BY
his ATTORNEY F. M. PETERS.
MACHINE FOR SETTING UP CARTONS AND THE LIKE.
APPLICATION FILED APR. 4, 1908.
1,025,880.
Patented May 7, 1912.
13 SHEETS—SHEET 10.
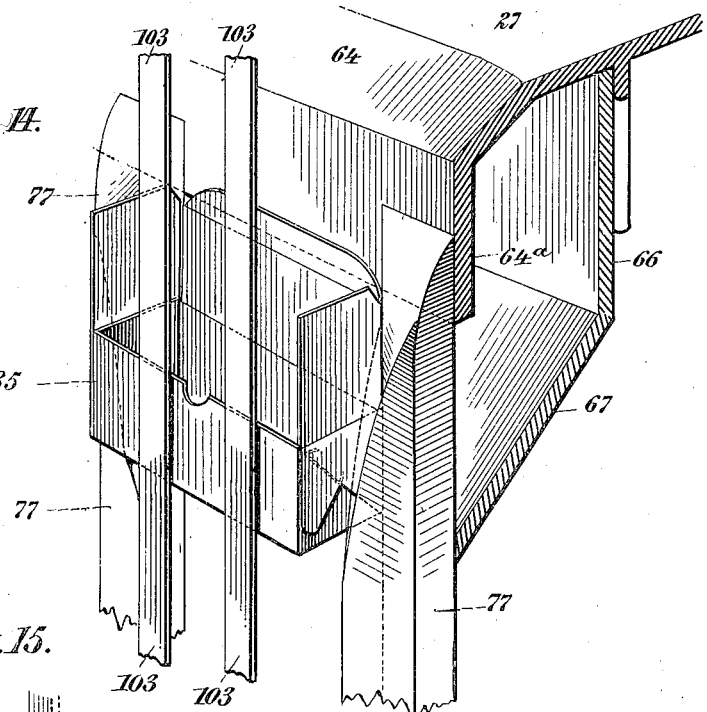
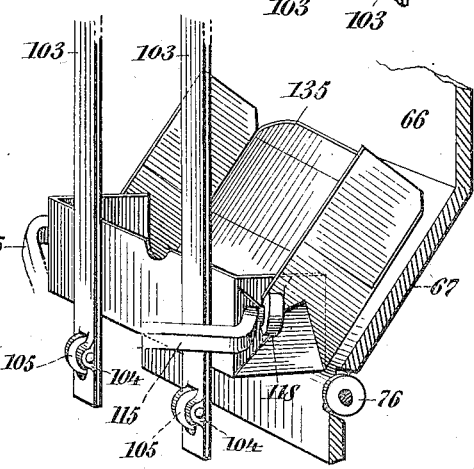
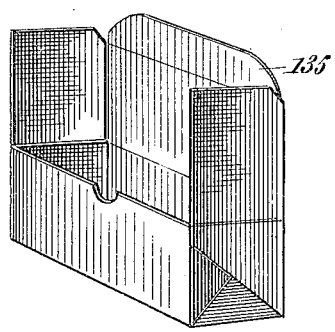
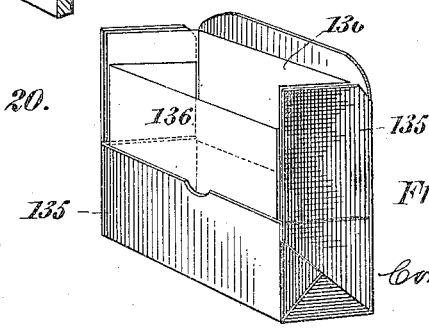
WITNESSES:
INVENTOR
Frank M. Peters
BY
his ATTORNEY

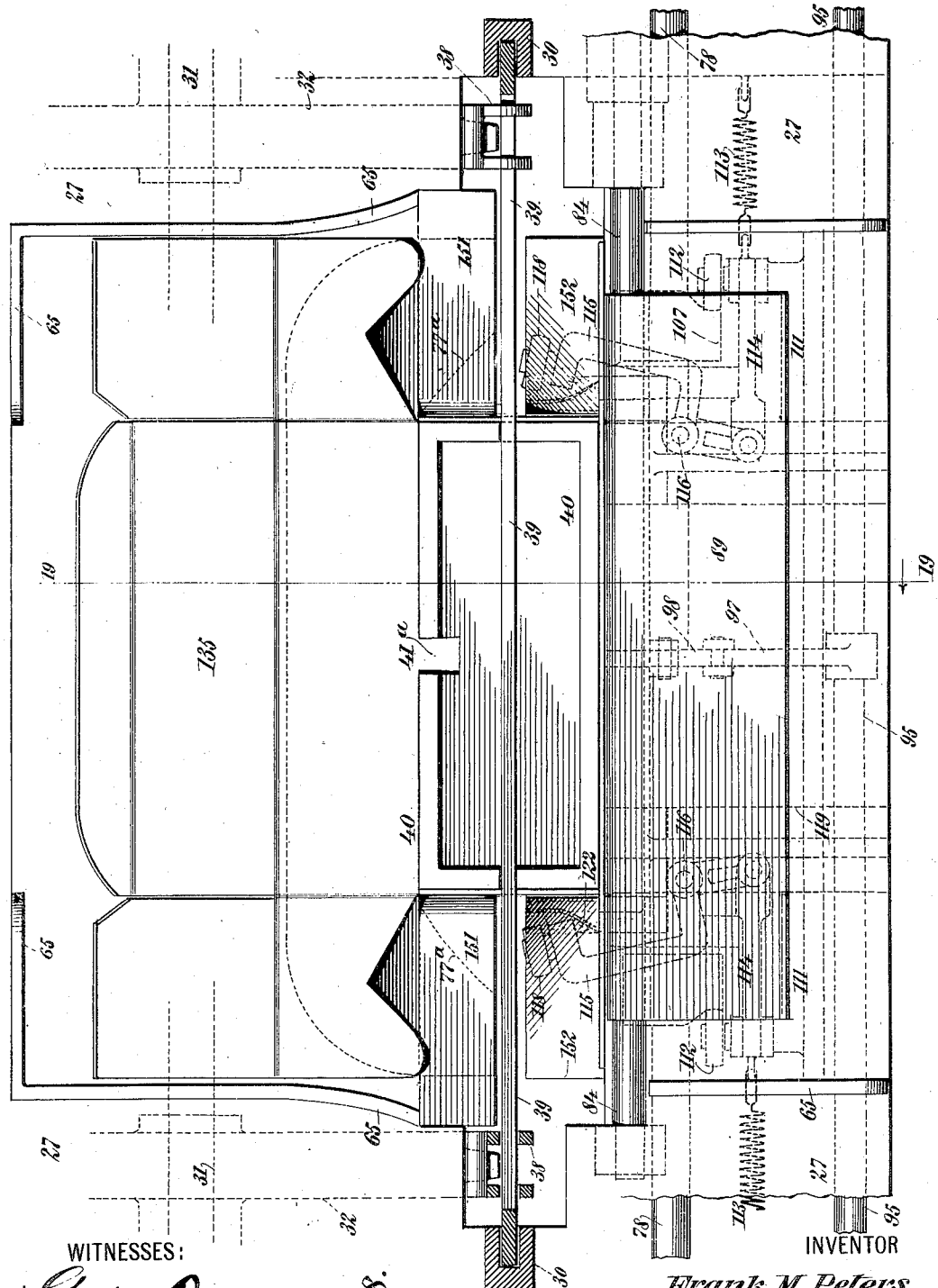

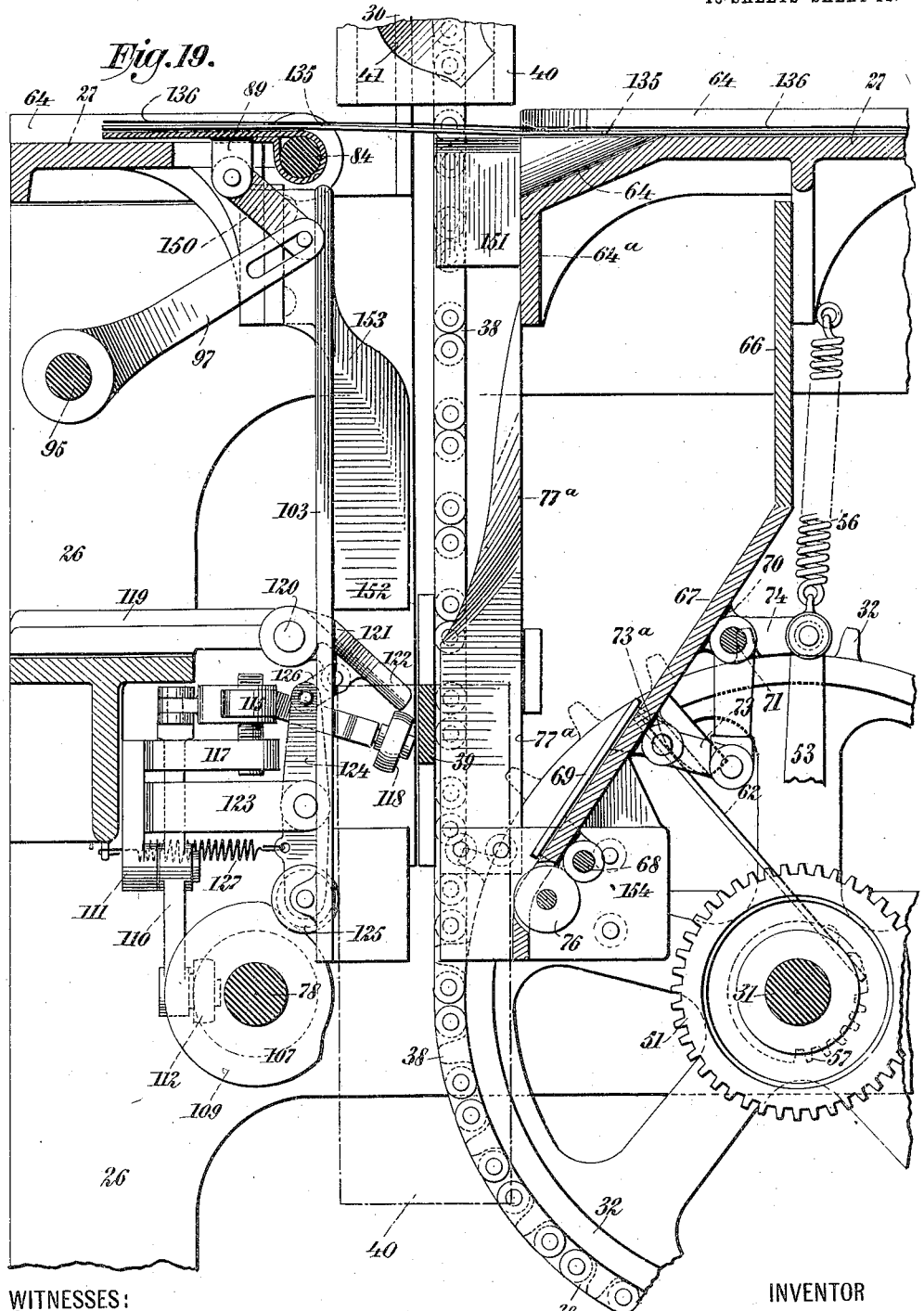

F. M. PETERS.
MACHINE FOR SETTING UP CARTONS AND THE LIKE.
APPLICATION FILED APR. 4, 1908.

1,025,880.

Patented May 7, 1912.
13 SHEETS—SHEET 13.

WITNESSES:

INVENTOR
Frank M. Peters
BY
his ATTORNEY

UNITED STATES PATENT OFFICE.

FRANK M. PETERS, OF CHICAGO, ILLINOIS.

MACHINE FOR SETTING UP CARTONS AND THE LIKE.

1,025,880.     Specification of Letters Patent.      Patented May 7, 1912.

Application filed April 4, 1908. Serial No. 425,215.

*To all whom it may concern:*

Be it known that I, FRANK M. PETERS, a citizen of the United States, residing at the city of Chicago, Cook county, Illinois, have invented certain new and useful Improvements in Machines for Setting Up Cartons and the Like, of which the following is a full, clear, and exact specification.

My invention relates to improvements in means for setting up or forming receptacles, and the same has for its object more particularly to provide an efficient, reliable and positively operated machine for setting up or forming receptacles or boxes made of cardboard and the like.

Further, said invention has for its object to provide a machine wherein the blank which may be fed into the machine either by hand or automatically by any convenient means, is folded to form a box comprising a bottom, side, end members and cover, and the end members then secured together to hold the box or receptacle together and in shape.

Further, said invention has for its object to provide a machine for setting up cartons and simultaneously with the shaping thereof provides such cartons with a protective lining, which may be supplied thereto in any convenient manner.

Further, said invention has for its object to provide a means for automatically locking one end member at each end of the receptacle in engagement with its coöperating member in order to hold the receptacle or box to its shape and form.

To the attainment of the aforesaid objects and ends my invention consists in the novel details of construction, and in the combination, connection and arrangement of parts hereinafter more fully described and then pointed out in the claims.

Figure 4:
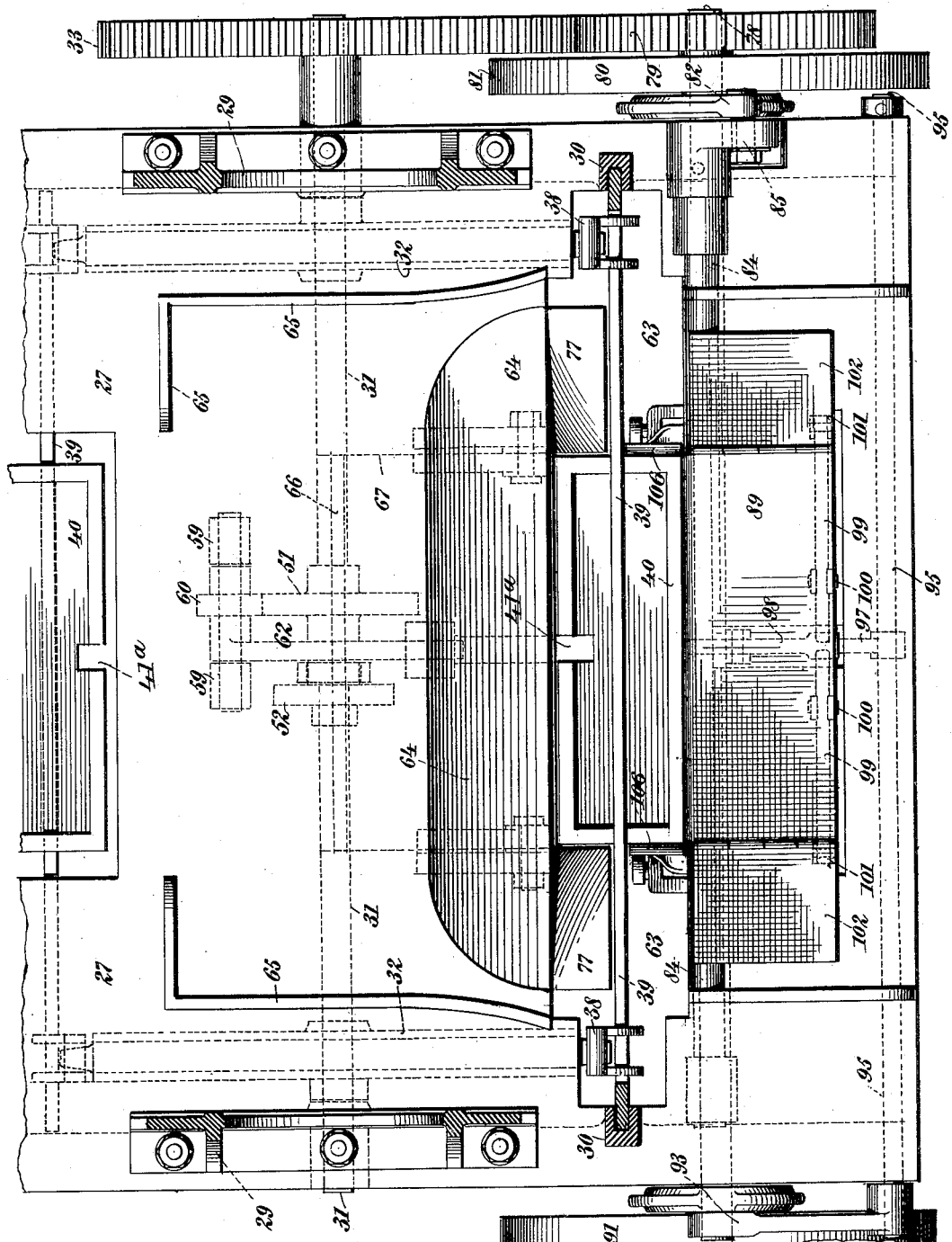
Figure 6:
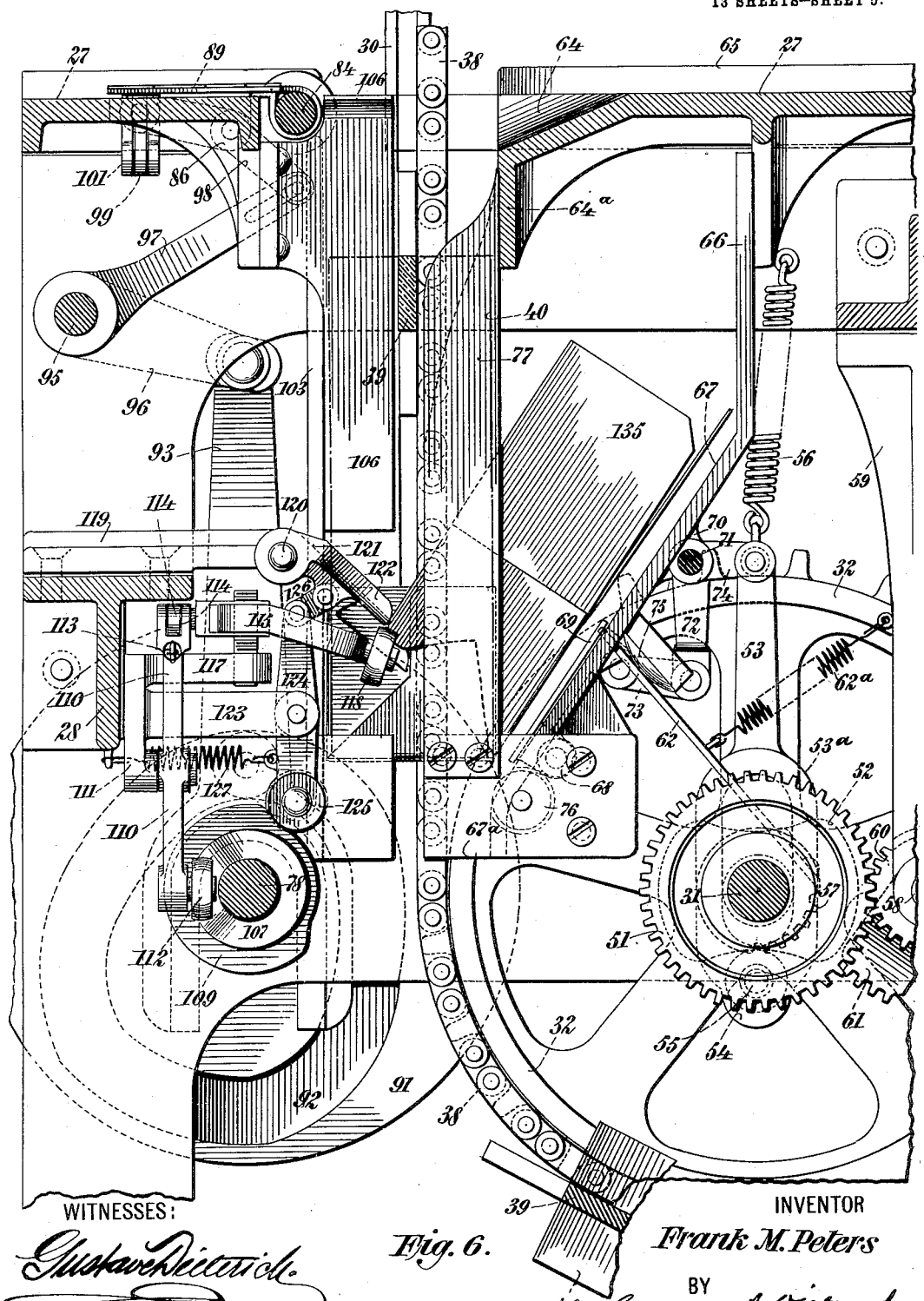
Figure 7:
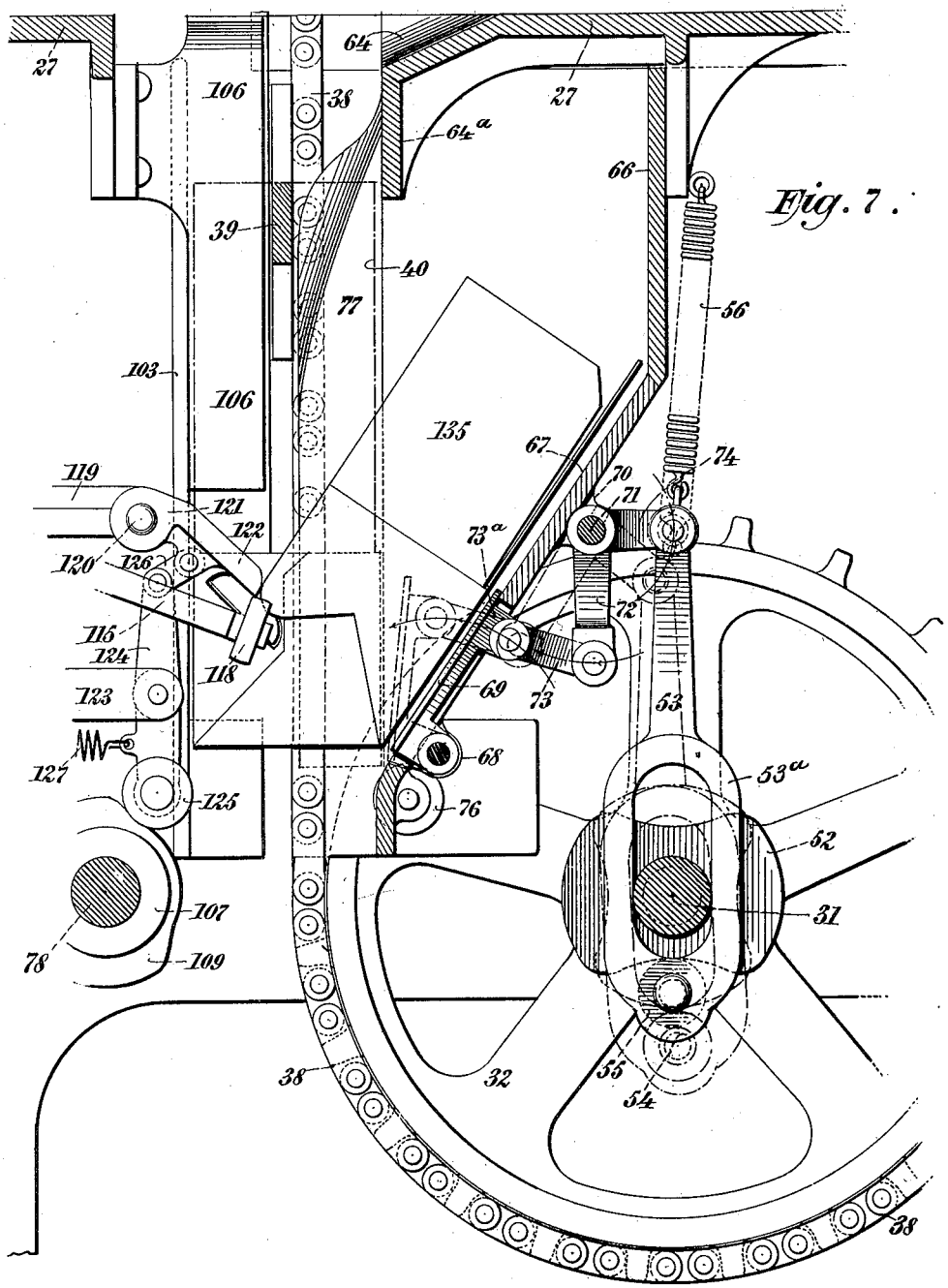
Figure 21:
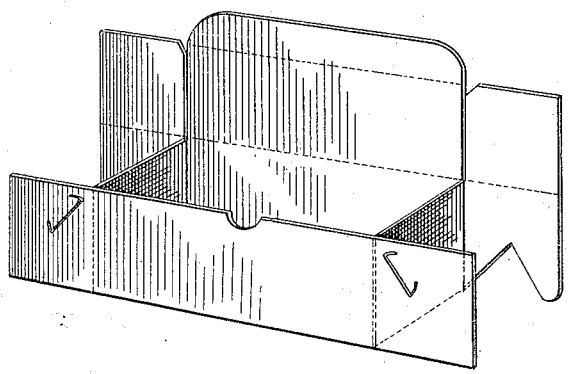
Figure 22:
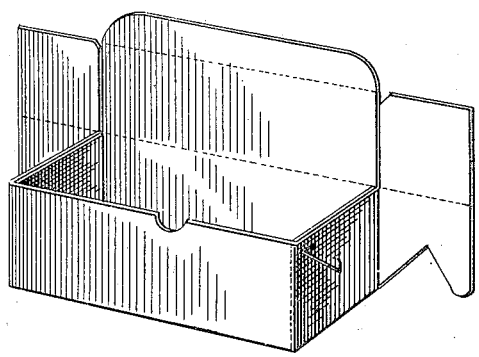
Figure 23:
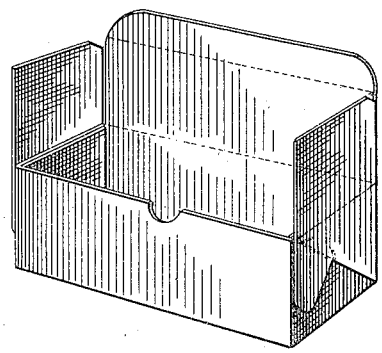

In the accompanying drawings forming part of this specification, wherein like numerals of reference indicate like parts, Figure 1 is a vertical section showing one form of machine made according to and embodying my said invention; Fig. 2 is an enlarged horizontal section taken on the line 2—2 of Fig. 1; Fig. 3 is an enlarged detail vertical section taken on the line 3—3 of Fig. 2, looking in the direction of the arrow *a*; Fig. 4 is an enlarged detail horizontal section taken on the line 4—4 of Fig. 1; Fig. 5 is an enlarged detail side view showing the means for removing the completed carton from its head or former; Fig. 6 is an enlarged detail vertical section taken on the line 6—6 of Fig. 2, looking in the direction of the arrow *b*; Fig. 7 is an enlarged detail vertical section taken on the line 7—7 of Fig. 9, showing the mechanism for tucking the ends of the carton; Fig. 8 is a front view of the upper portion of the machine; Fig. 9 is a rear view of the lower portion of the machine shown in section at Fig. 7; Fig. 10 is an enlarged detail horizontal section partly broken away, showing a carton blank in position in the machine, and the head or former in position above the same; Figs. 11, 12, 13, 14 and 15 are detail perspective views showing the successive steps or operations performed by the machine in making a carton; Fig. 16 is a perspective view showing a completed carton; Fig. 17 is an enlarged detail plan view showing the means for guiding one part of each carton end into locking engagement with its coöperating part; Fig. 18 is an enlarged horizontal section illustrating a modified construction, and Fig. 19 is a vertical section taken on the line 19—19 of Fig. 18; Fig. 20 is a perspective view showing a completed carton provided with a protective lining; and Figs. 21, 22 and 23 are detail perspective views showing the successive steps or folding operations performed by the modified construction shown at Figs. 18 and 19.

In said drawings 25 denotes the main frame of the machine comprising end members 26 26 secured together by a top plate 27 and transverse members 28, 28. At each end of said frame 25 are secured upwardly projecting standards 29, 29, provided at their front portions with vertical U-shaped guides 30, 30 which extend from the upper ends of said standards 29 to the top plate 27 of the machine (Figs. 1, 4 and 8).

31 denotes a shaft having its ends supported in the frame members 26, 26 below the top plate 27. (Figs. 1, 2, 6 and 7). Upon said shaft within the frame members 26, 26 are fixed sprocket wheels 32, 32 and at one of the projecting ends of said shaft is fixed a gear wheel 33.

35 denotes a shaft supported in adjustable bearings 36, 36 arranged in the upper ends of the standards 29, 29, and 37, 37 sprocket wheels fixed thereon.

38, 38 denote sprocket chains passing through the top plate 27 and connecting the sprocket wheels 37, 37 with the sprocket wheels 32, 32 on said shaft 31. The sprocket chains 38, 38 are connected together by a series of transverse bars 39, 39 to which are secured the upper ends of rectangular heads or carton formers 40, 40. Each of said heads or formers 40 is provided in its opposite ends with a recess or depression 41, and at its rear portion or side with a vertical opening 41$^a$, the purpose of which will be pointed out hereafter.

At the middle of the shaft 35 which is supported in the upper ends of the vertical standards 29, 29, is secured a cam 42 (Figs. 1 and 8), and below said shaft 35 is a shaft 43 which is also supported at its ends in the standards 29, 29.

44 denotes a bell crank lever mounted upon the shaft 43 having its upper member bent and provided with a roller 45 adapted to slide on the cam 42, and its lower or horizontal member provided at its forward end with a transverse bar 46, to the ends of which are pivotally connected depending links 47 47.

48 denotes a transverse bar mounted upon the standards 29, 29, and upon said bar are pivotally secured fingers 49, 49, for holding a protective lining properly distended and in position for the subsequent folding operation. Said fingers are provided at their upper ends with angular extensions 50, 50, to the ends of which are pivotally connected the lower ends of the links 47, 47.

Upon the shaft 31, between the end members 26, 26 of the frame, is fixed a gear 51, and to one side of said gear 51 is fixed a double cam 52 (Figs. 1, 3, 6, 7 and 9).

53 denotes an arm having a slotted lower portion 53$^a$ embracing the shaft 31, and at its lower end said arm 53 is provided with a lateral stud 54 upon which is mounted a roller 55 adapted to ride upon the periphery of the cam 52.

56 denotes a coiled spring having its lower end secured to the upper end of the arm 53, and its upper end secured to the underside of the top plate 27 of the frame, to hold said arm 53 normally drawn up and the roller 55 in engagement with the surface of the cam 52.

57 denotes a segmental gear loosely mounted upon the shaft 31 intermediate the gear 51 and the cam 52 (Figs. 3, 6 and 9).

58 denotes a short horizontal shaft supported in depending bearings 59, 59 secured to the underside of the top plate 27. Upon said shaft 58, intermediate its depending bearings 59, 59, is a small gear 60 meshing with the gear wheel 51 on the shaft 31, and a segmental gear 61 adapted to engage with the segmental gear 57 also arranged upon the shaft 31.

62 denotes a finger secured to the upper sides of the segmental gear 57, and 62$^a$ a coil spring secured to said finger and one of the bearings 59 for holding the free end of said finger normally raised.

The top plate 27 of the machine is provided adjacent to its front edge with a longitudinal opening 63 (Fig. 4), and adjacent to said opening 63 the top plate 27 is provided with an inclined entrance portion 64. 65 denotes a rectangular guide for the carton blank extending from the aperture 63 rearwardly and partly inclosing the inclined entrance portion 64 of the top plate 27.

The guide 65 is adapted to receive a carton blank and hold the same in position to be acted upon by the heads 40 carried by the transverse members 39 39 secured to the sprocket chains 38, 38.

Upon the underside of the top plate 27 is secured a depending support or guide comprising a vertical section 66, and a downwardly and forwardly-inclined section 67 provided with a recess 68$^a$ to receive the free end of the finger 62 secured to the segmental gear 57 (Figs. 1, 3 and 7). Adjacent to the opposite lower edges of the inclined portion 67 of said support or guide are provided bearings 68, 68 in which are pivotally supported the lower edges of plates 69, 69, and upon the underside of said inclined portion 67, above the hinged plates 69, 69, are provided bearings 70, 70 in which is mounted a shaft 71 having fixed thereon depending arms 72, 72 which are pivotally connected at their lower ends by means of links 73, 73 to bearings 73$^a$, 73$^a$ provided upon the sides of the hinged plates 69, 69 adjacent to the upper ends thereof.

74 denotes an arm having one end fixed to the shaft 71 at right angles to the depending arms 72, 72, and its other end pivotally secured to the upper end of the vertically movable arm 53 which has its lower end disposed about the shaft 31 (Fig. 7).

75 denotes a buffer arranged upon the rear side of the inclined portion 67 against which the free end of the finger 62 is adapted to strike, and be held under tension of the coil spring 62$^a$.

76, 76 denote rollers arranged at the lower edge of the inclined portion 67 directly below the hinged edges of the plates 69, 69 over which rollers the carton, as the same is being formed, is adapted to pass.

77, 77 denote downwardly and oppositely inclined guides arranged below the longitudinal opening 63 and secured at their upper ends to the under side of the top plate 27, and at their lower ends to the brackets 67$^a$, at the lower end of the inclined guide portion 67.

78 denotes a driving shaft supported at its opposite ends in the side members 26, 26 of the frame directly in front of the shaft 31. Upon the right hand end of said driving shaft 78 is fixed a gear wheel 79 which meshes with the large gear wheel 33 fixed on the shaft 31, and beside said gear wheel 79 is fixed a cam 80 having a groove 81 therein, which is adapted to operate a hinged plate or member for folding the front flap or portion of the carton.

82 denotes a vertical rod having its lower end bifurcated and straddling the shaft 78 intermediate the cam 80 and the right hand frame member 26 (Figs. 2, 3 and 4). Upon said rod 82 adjacent to its bifurcated end is provided a bearing carrying a roller 83 which is adapted to work in the cam groove 81 of the cam 80.

84 denotes a shaft arranged in front of the machine, and supported at its opposite ends in the frame members 26 26 adjacent to the front edge of the opening 63 and below the top plate 27, and 85 denotes an arm secured at one end to the shaft 84, and having its other end pivotally connected to the rod 82.

89 denotes a plate which is fixed along one of its longitudinal edges to the shaft 84 adjacent to the front edge of the opening 63 in the top plate 27.

At the opposite end of the driving shaft 78 is fixed a driving pulley 34, and a cam 91 having a groove 92 upon its inner surface (Figs. 2, 3, 4 and 6).

93 denotes a vertical rod having its lower end bifurcated and straddling the shaft 78 intermediate the cam 91 and the left hand frame member 26, and adjacent to its bifurcated end said arm 93 is provided with a roller 94 which is adapted to work in the groove 92 of the cam 91.

95 denotes a shaft which is supported at its ends in the frame members 26, below the top plate 27, and provided at its left hand projecting end with an arm 96 which is pivotally secured at its other end to the upper end of the vertical rod 93. (Figs. 1, 2, 3, 4 and 6).

97 denotes an arm which is fixed at one end to the shaft 95 at about its middle, and its other end slotted and pivotally secured to one end of a lever 98 supported intermediate its ends in a bearing 86 on the underside of the top plate 27, and has its forward end in pivotal engagement with the inner opposing ends of transverse levers 99, 99 pivotally mounted in bearings 100, 100 provided in the underside of the hinged plate or member 89, while the other ends of said levers 99, 99 are pivotally secured to depending bearings 101, 101 provided upon the undersides of the wing sections 102, 102 adjacent to their inner edges at which said wing sections are pivotally secured to the opposite ends of said hinged plate or member 89.

Upon the underside of the top plate 27 at the front edge of the longitudinal opening 63 are secured the upper ends of depending guides 103, 103 which are provided at their lower ends with bearings 104, 104 in which are mounted rollers 105, 105 which serve to guide the front member of the carton blank and hold the same against the front of the head 40, and at the opposite ends or side edges of said longitudinal opening 63 are arranged similar guides 106, 106 which are adapted to engage the bottom end flaps, adjacent to their forward inclined edges, and fold the same upon the slitted front end flaps which had previously been folded against the ends of said head 40. The said guides 106, 106 have their upper ends bent outwardly and secured adjacent to said ends, along their vertical edges, to the under side of the top plate 27. The guides 103, 103 serve to guide the front flap or portion of the carton, and the guides 106, 106 serve to guide the end flaps of the carton as the carton is carried downward upon the head or block 40. On said driving shaft 78, adjacent to the inner sides of the sprocket wheels 34, 34, are fixed double cams 107, 107 each of which is provided with cam surfaces 108, 109 (Figs. 2, 3 and 6). 110, 110 denote vertical levers which are pivotally supported intermediate their ends upon bearings 111, 111 provided upon the rear side of the forward transverse member 28, and at the lower ends of said vertical levers are provided rollers 112, 112 which are held normally in contact with, and adapted to ride upon the cam surfaces 108, 108, under tension of springs 113, 113, secured to the upper ends of said levers 110, and to the end members 26, 26 of the frame.

114, 114 denote links which are pivotally secured each at one end to the upper ends of the vertical levers 110, 110, and have their inner ends pivotally connected to the slotted ends of the horizontal bell-crank levers 115, 115 which are mounted upon pivot screws 116, 116 secured in projections 117, 117 extending inwardly from the bearings 111, 111 (Figs. 2, 3 and 4). The inner ends of the levers 115, 115 are made substantially U-shaped and provided at their extreme ends with rollers 118, 118 adapted to engage the locking flaps of the carton ends and press the same into the slits in the coöperating end members, the carton ends being permitted to yield sufficiently for this purpose owing to the recesses 41, 41 provided in the opposite ends of the heads 40 carried by the sprocket chains 38, 38. Upon the front transverse member 28 (Figs. 2 and 6) are provided bearings 119, 119 in which is supported a shaft 120 having fixed thereon inwardly extending guide arms 121, 121 which have their free ends disposed substantially below the lower ends of the vertical guides 106, 106, and provided in their upper surfaces with tapering grooves 122, 122 adapted to receive the tucking tongues of the carton and guide the same into position to be forced into the slit in the coöperating end member to hold the carton to its shape.

The bearings 111, 111 are further provided with inwardly extending projections 123, 123 at the inner ends of which are pivotally supported levers 124, 124 provided at their lower ends with rollers 125, 125 adapted to ride upon the cam surfaces 109, 109, and the upper ends of said levers are pivotally connected by means of links 126, 126 to the undersides of the guide arms 121, 121 mounted on the shaft 120.

The rollers 125, 125 at the lower ends of the levers 124, 124 are held normally in contact with the cam surfaces 109, 109 by means of coiled springs 127, 127 each of which has one end secured to the underside of the top plate 27, and its other end secured to the lever 124.

At the lower portion of the frame 25 (Fig. 1) in line with the opening 63 in the top plate 27, are provided bearings 130 in which are transverse rollers 131, over which passes an endless conveyer or belt 132 to receive the cartons as the same are removed from the heads 40, 40. 133, 133, denote inclined longitudinal guides arranged at each side of the belt or conveyer 132.

Assuming the machine to be in operation, and the endless sprocket chains 38, 38 carrying the heads or formers 40, 40 to be moving in the direction of the arrows c (Fig. 1) the operation of setting up a carton and at the same time providing it with a protective lining consisting of a sheet 136 of paper or other material, preferably rendered impervious to moisture, is as follows: A carton blank 135 is first placed in position within the guide 65, and a sheet of protective lining 136 properly adjusted in position thereon. As soon as the bottom of one of the heads or formers 40 about come into contact with the carton blank 135, and its protective sheet 136 thereon disposed within the guide 65 on the top plate 27, it will cause the same to be pressed downwardly and into the longitudinal opening 63 in said top plate 27. However, just before the block or head 40 comes into engagement with the upper surface of the carton blank and its lining, the hinged plate or member 89 will be raised through the action of the cam 80 lifting the rod 82, which in turn partially rotates the shaft 84 carrying the plate or member 89 by means of the crank arm 85, and by the time the bottom of said head 40 is on about a line with the top plate 27, the said hinged plate or member 89 will have been brought to a vertical position and hold the front member or portion of the carton pressed against the front surface of the head or former 40. When the hinged plate or member 89 has assumed a position about midway between its horizontal and vertical positions (at about an angle of 50 degrees), the hinged wing sections or end members 102, 102 will be folded inwardly toward the end of the head 40 by the action of the cam 91, acting upon the rod 93, which in turn partially rotates the arm 96, secured to the left hand end of the shaft 95, and also partially rotates the arm 97 connected to the lever 98, which latter has its upper end in pivotal engagement with the inner opposing ends of the levers 99, 99, mounted in bearings 100, 100 secured in the underside of the plate 89. The outer ends of said levers 99, 99 are pivotally secured to bearings in the underside of the wing sections 102, 102. By the time the hinged plate 89 has assumed the vertical position as aforesaid, the wing sections or end members 102, 102 will serve to press the front end flaps of the carton containing the slits inwardly against the ends of the head or former 40. The position of the parts at about this time will be as illustrated in Fig. 11. Hereupon the head 40 with its carton blank begins to enter the longitudinal opening 63, and the bottom end flaps are brought into engagement with the upper outwardly curved ends of the folding guides 106, 106, and cause the same to fold said bottom end flaps upwardly against the folded front end flaps, as the carton is carried downwardly into the horizontal opening 63, and caused to assume the position illustrated at Fig. 12. At about this time the free ends of the fingers 49, 49 will be caused to move downwardly toward each other until their lower transverse edges assume a position at an angle of about 45 degrees to the top plate 27, by the action of the cam 42 on the shaft 35. This causes the end of the vertical member of the bell crank lever 44 to move inwardly toward the shaft 35, and the forward end of its horizontal member to descend, and cause the links 47, 47, which are connected at their lower ends to the angular projections 50, 50 of the fingers 49, 49, to engage the protective lining 136, at the junction of the carton back with its end flaps, and hold said protective lining distended for the subsequent folding operation. At this period of the folding operations, the bottom of the carton is on about a line with the front edge of the inclined portion 64 of the top plate 27, and as the head 40 descends farther, the back and cover members of the carton are brought to a position at right angles to the bottom of the carton, and against the rear side of the head 40 by their contact with the flange portion 64$^a$ depending from the front edge of the inclined entrance portion 64, as illustrated at Fig. 13. Hereupon the lower edges of the back end flaps with their tucking tongues come into engagement with the upper ends of the vertical guides 77, 77 and the same are folded against the upturned bottom end flap thereof, as illustrated at Fig. 14. The head 40 with its carton and protective lining thereon thereupon continues to descend until the upper edge of the cover member of the carton comes into position below the depending flange 64$^a$, arranged at the front edge of the inclined portion 64 of the top plate 27, whereupon the said cover portion and back portion of the carton with its lining will be caused to fall rearwardly against the inclined guide portion 67 by the action of the grooved arms 121, 121 engaging the tucking tongues of the back end flaps of the carton and guiding the same into position to be inserted into the slits in the front end flaps with the next step in the operation. The grooved arms or guides 121, 121 are actuated by means of the levers 124, 124 which have their upper ends connected to said arms or guides 121, 121, by links 126, 126, and their lower ends provided with rollers 125, 125 working upon the cams 109, 109 on the driving shaft 78. At about the same time, the rollers 118, 118, carried by the inner ends of the bell-crank levers 115, 115, will be forced into engagement with the slotted front end flaps, and open the slits therein for the reception of the tucking tongues of the rear end flaps. This operation being produced by the action of the levers 110, 110 which have their upper ends pivotally connected to the bell-crank levers 115, 115 by links 114, 114 and their lower ends provided with rollers 112, 112, working upon the cams 108, 108, on the driving shaft 78. At this stage of the folding operation the parts will be in position indicated at Fig. 15. Hereupon the back member of the carton and its cover are again brought to a vertical position by means of the hinged plates 69, 69, which are arranged at the lower edge of the inclined guide portion 67, and actuated by the cam 52 fixed to the shaft 31, the rod 53 and its roller 55 engaging said cam, together with the arm 74 fixed to the shaft 71 carrying the depending arms 72, 72, which have their lower ends connected by links 73, 73, to said hinged plates 69, 69, adjacent to their upper edges. As the back and cover member of the carton are thus brought to the vertical position, the locking tongue arranged on the back end flap member is inserted into the slit in the front end flap by the action of said hinged plate in coöperation with the rollers 118, 118, carried by the bell-crank levers 115, 115; the several end flaps being capable of yielding inwardly sufficiently for this purpose owing to the recesses 41, 41 provided in the opposite ends of the heads 40, 40. This completes the operation of folding and locking the carton to its shape and form, and the carton thereupon continues to be carried downwardly upon its head 40 to the point where the upper edge of the front member or flap of the carton comes into position at a point just below the rollers 105, 105 carried at the lower ends of the front vertical guides 103, 103. At about this time the segmental gear 61 comes into engagement with the segmental gear 57 carried upon the shaft 31, and causes said gear and the finger 62 carried thereby to be partially rotated, and in being so rotated, bring the free end of said finger 62 into the vertical opening 41$^a$ in the head 40, and into contact with the upper edge of the upstanding cover portion, and knock the carton from its head or former 40. The open carton, in the form shown at Fig. 20, then drops upon an endless conveyer or belt 132 arranged in the lower part of the machine and is then carried away to receive its contents and be closed. As soon as the carton has been knocked or removed from the head 40 the finger 62 will be restored to its initial position against the buffer 75 by the action of the spring 62$^a$. Hereupon the operation just described will be repeated as the next head 40 comes into engagement with a new carton and lining placed within the guide 65 on the top plate 27, and the operations continued as long as the machine is kept in operation and blanks supplied to the top plate 27.

The particular form of carton and the method of folding the same is given merely for the purposes of illustration, and any well known form of carton having tucking and locking flaps may be used, and the machine adapted thereto without departing from the spirit of the invention, and in the modification about to be described I show a construction wherein the order of folding the end flaps is varied; that is to say, the bottom end flaps (which are rectangular in this instance) are first folded upwardly adjacent to the ends of the head, and subsequently in the course of the operation of the machine the front end flaps and the back end flaps are then folded and locked together. In said modification, as illustrated at Figs. 18 and 19, the main operating parts of the machine are substantially as above described, except that in this modification the hinged plate 89, which is mounted upon the shaft 84, is not provided with the wing sections 102, 102 for folding the front end flaps of the carton. The said plate 89 is directly operated by means of a link 150 which is secured to the underside thereof, and to the slotted end of the arm 97 on the shaft 95. Adjacent to the opposite ends of the opening 63 in the top plate 27 are provided short guides 151, 151 which are secured to the top plate 27 in front of the inclined portion 64, and have their upper ends bent outwardly toward the ends of the machine, said guides being adapted to engage the bottom end flaps of the carton and fold the same against the ends of the head 40 as the carton blank is carried downwardly upon said head, as shown at Fig. 21. Upon the underside of the top plate 27 adjacent to, and below the front edge of the opening 63 therein are folding guides 152, 152 which have their upper ends secured to the underside of the top plate 27. Said guides 152, 152 have their upper portions 153, 153 diagonally beveled or curved downwardly and inwardly toward the opening 63 in the top plate 27, and are adapted to engage the front end flaps of the carton blank and fold the same inwardly against the folded bottom end flaps as shown at Fig. 22, and hold the same in position to be engaged by the succeeding folding mechanism. Directly to the rear of said guides 152, 152 and below the guides 151, 151, are arranged guides 77ª, 77ª which have their upper ends secured to the depending flange 64ª, and their lower ends secured to brackets 154, 154, at the lower ends of the inclined guide portion 67. The said guides 77ª, 77ª, have their upper ends beveled inwardly and forwardly and are adapted to engage the back end flaps of the carton and fold the same against the folded front and bottom end flaps of the carton blank, as shown at Fig. 23, and hold the same in position to be acted upon by the tucking mechanism in the manner hereinbefore described, by means of which the tucking tongue of the back end flap is inserted into the slotted front end flap and the carton thereby locked to its shape.

It will, of course, be understood that in the successive steps or operations of folding a carton the protective lining is folded simultaneously therewith. Further, it is to be noted that where a carton is to be formed without an inner protective lining the operation above described is performed in the same manner with the exception that the fingers 49, 49, cam 42, and the parts intermediate the same, while operating as heretofore described, perform no function when an unlined carton is being made.

Having thus described my invention, what I claim and desire to secure by Letters Patent is:

1. A machine of the character described comprising a head, means for imparting movement thereto, means for supporting a carton blank having end flaps; certain of said end flaps being provided with interlocking means, and means arranged in the path of travel of said head and coöperating therewith, for forming a carton upon said head, and locking the ends of said carton together, in the course of its movement through the machine, substantially as specified.

2. A machine of the character described comprising a head, means for imparting movement thereto, means for supporting a carton blank having ends; certain of said ends being provided with engageable means and other of said ends with engaging means, and a lining in position upon said blank, means arranged in the path of travel of said head and coöperating therewith for forming a carton upon said head, and locking the ends of said carton together and interfolding the edges of said lining therewith, in the course of its movement through the machine, substantially as specified.

3. A machine of the character described comprising a head, means for imparting movement thereto, means for supporting a carton blank having end flaps; certain of said end flaps being provided with engaging means, and other of said end flaps provided with engageable means to receive said engaging means, and means arranged in the path of travel of said head and coöperating therewith for forming a carton upon said head, and locking said end flaps together in the course of the movement of said carton blank through the machine, substantially as specified.

4. A machine of the character described comprising a head, means for imparting movement thereto, means for supporting a carton blank having end flaps; certain of said end flaps being provided with engaging means, and other of said end flaps provided with engageable means to receive said engaging means, a lining disposed upon said blank, and means arranged in the path of travel of said head, and coöperating therewith for forming a carton upon said head, and locking said end flaps together, and interfolding the edges of said lining therewith in the course of the movement of said carton blank through the machine, substantially as specified.

5. A machine of the character described comprising a head, means for imparting movement thereto, means for supporting a carton blank having end flaps; certain of said end flaps being provided with integral engaging means, and other of said end flaps provided with integral engageable means to receive said engaging means, and means arranged in the path of travel of said head, and coöperating therewith for forming a carton upon said head and locking said end flaps together in the course of the movement of said carton blank through the machine, substantially as specified.

6. A machine of the character described comprising a head, means for imparting movement thereto, means for supporting a carton blank having end flaps; certain of said end flaps being provided with integral engaging means to receive said engaging means, a lining disposed upon said blank, and means arranged in the path of travel of said head, and coöperating therewith for forming a carton upon said head and locking said end flaps together, and interfolding the edges of said lining therewith in the course of the movement of said carton blank through the machine, substantially as specified.

7. A machine of the character described comprising a head, means for imparting movement thereto, means for supporting a carton blank having end flaps; certain of said end flaps being provided with locking members, and other of said end flaps provided with means to receive said locking members, and means arranged in the path of travel of said head, and coöperating therewith for forming a carton upon said head and locking said end flaps together in the course of the movement of said carton through the machine, substantially as specified.

8. A machine of the character described comprising a head, means for imparting movement thereto, means for supporting a carton blank having end flaps; certain of said end flaps being provided with locking members and other of said end flaps provided with means to receive said locking members, a lining disposed upon said blank, and means arranged in the path of travel of said head, and coöperating therewith for forming a carton upon said head and locking said end flaps together, and interfolding the edges of said lining therewith in the course of the movement of said carton blank through the machine, substantially as specified.

9. A machine of the character described comprising a head, means for imparting movement thereto, means for supporting a carton blank having end flaps; certain of said end flaps being provided with locking members formed integral therewith, and other of said end flaps provided with means arranged in the path of travel of said head, and coöperating therewith for forming a carton upon said head and locking said end flaps together in the course of the movement of said carton blank through the machine, substantially as specified.

10. A machine of the character described comprising a head, means for imparting movement thereto, means for supporting a carton blank having end flaps; certain of said end flaps being provided with locking members formed integral therewith, and other of said end flaps provided with means to receive said locking members, a lining disposed upon said blank, and means arranged in the path of travel of said head, and coöperating therewith for forming a carton upon said head and locking said end flaps together, and interfolding the edges of said lining therewith in the course of the movement of said carton blank through the machine, substantially as specified.

11. A machine of the character described comprising a head, means for imparting movement thereto, means for supporting a carton blank having end flaps; certain of said end flaps being provided with tongues, and other of said end flaps provided with slots to receive said tongues, and means arranged in the path of travel of said head, and coöperating therewith for forming a carton upon said head and locking said end flaps together in the course of the movement of said carton blank through the machine, substantially as specified.

12. A machine of the character described comprising a head, means for imparting movement thereto, means for supporting a carton blank having end flaps; certain of said end flaps being provided with tongues, and other of said end flaps provided with slots to receive said tongues, a lining disposed upon said blank, and means arranged in the path of travel of said head, and coöperating therewith for forming a carton upon said head and locking said end flaps together, and interfolding the edges of said lining therewith in the course of the movement of said carton blank through the machine, substantially as specified.

13. A machine of the character described comprising a head, means for imparting movement thereto, means for supporting a carton blank having foldable ends, and certain of said ends provided with locking means, means arranged in the path of travel of said head and coöperating therewith for shaping said blank to said head, and means for locking the ends of said carton together, in the course of the movement of said head through the machine, substantially as specified.

14. A machine of the character described comprising a head, means for imparting movement thereto, means for supporting a carton blank having foldable ends; certain of said ends being provided with locking means, and a lining in position upon said blank, means arranged in the path of travel of said head and coöperating therewith for shaping said blank to said head, and means for locking the ends of said carton together and interfolding the edges of said lining therewith, in the course of the movement of said head through the machine, substantially as specified.

15. A machine of the character described comprising a head, means for imparting movement thereto, means for supporting a carton blank having bottom end flaps, and side end flaps provided with locking means, means arranged in the path of travel of said head and coöperating therewith, to shape said blank to said head, and means for locking said side end flaps of the blank together and confining the bottom end blank thereunder, substantially as specified.

16. A machine of the character described comprising a head, means for imparting movement thereto, means for supporting a carton blank having ends, and locking means for said ends, in position to be engaged by said head, means arranged in the path of travel of said head, and coöperating therewith to shape said blank to said head, and means also located in the path of travel of said head acting upon said locking means to secure the ends of said blank together, substantially as specified.

17. A machine of the character described comprising a head, means for imparting movement thereto, means for supporting a carton blank having interlocking ends, in position to be engaged by said head, means arranged in the path of travel of said head, and coöperating therewith, to shape said blank to said head, and means also located in the path of travel of said head for interlocking certain of the ends of said carton with each other, and confining the remainder of said ends of said blank within said interlocked ends, substantially as specified.

18. A machine of the character described comprising a head, means for imparting movement thereto, means for supporting a carton blank having interlocking ends, and a lining, means arranged in the path of travel of said head, and coöperating therewith, to shape said blank and lining to said head, and means for securing the side end flaps of the blank together and confining the bottom end flap thereunder with the edges of said lining interfolded therewith, substantially as specified.

19. A machine of the character described, comprising a head, means for imparting movement thereto, means for supporting a carton blank having interlocking ends, and a lining, in position to be engaged by said head, means arranged in the path of travel of said head, and coöperating therewith, to shape said blank and lining to said head, and means also located in the path of said head for locking the ends of said blank together and securing the edges of said lining therebetween, substantially as specified.

20. A machine of the character described comprising a head, means for imparting movement thereto, means for supporting a carton having interlocking ends, and a lining in position to be engaged by said head, means arranged in the path of travel of said head, and coöperating therewith, to shape said blank and lining to said head, and means also located in the path of travel of said head for interlocking certain of the ends of said carton with each other, and confining the remainder of said ends of said blank thereunder with the edges of said lining interfolded therewith, substantially as specified.

21. A machine of the character described, comprising a moving head, means for supporting a carton blank having interlocking ends, and a lining in position to be acted upon by said head, and means arranged in the path of movement of said head for coincidently folding said carton blank and lining upon said head to form a carton, and means for locking said ends together, and interfolding the lining therewith, in the course of the movement of said head, substantially as specified.

22. A machine of the character described, comprising a moving head, means for supporting a carton blank, having interlocking ends, in position to be engaged by said head, means for shaping said carton blank to said head, and means for interlocking the ends of said carton to hold the same to its produced shape, in the course of the movement of said head, substantially as specified.

23. A machine of the character described, comprising a moving head, means for supporting a carton blank having interlocking ends, and a protective lining in position to be engaged by said head, means for coincidently shaping said carton and protective lining to said head, means for setting up said carton, and means for interlocking the ends of said carton whereby to hold the same to its produced shape, and maintain the protective lining in position therein, in the course of the movement of said head, substantially as specified.

24. A machine of the character described, comprising an endless moving support, heads carried on said support each adapted to engage a carton blank having interlocking ends, and means for interlocking the ends of said carton blank and forming a carton on said head, in the course of its movement, substantially as specified.

25. A machine of the character described comprising an endless moving support, a plurality of heads carried thereon each adapted to engage a carton blank having interlocking ends, means adapted to engage said blank to shape the same to its head, and means for interlocking the ends of said blank to secure said shaped blank in form, substantially as specified.

26. A machine of the character described comprising an endless moving support, a plurality of heads carried thereon each adapted to engage a carton blank having interlocking ends, and a lining, means adapted to engage said blank and lining to shape same to said head, and means for interlocking the ends of said blank and interfolding the edges of said lining therewith, to secure said shaped blank and lining in form, substantially as specified.

27. A machine of the character described comprising an endless traveling support, a plurality of heads carried thereon, means for supporting a carton blank having interlocking ends, in position to be engaged by one of said heads, means for shaping said carton blank to said head in the course of its movement, and means for interlocking the ends of said carton blanks whereby to secure said shaped blank in form, substantially as specified.

28. A machine of the character described comprising an endless traveling support, a plurality of heads carried thereon, means for supporting a carton blank having interlocking ends, and a lining in position to be engaged by one of said heads, means for shaping said carton blank and lining to said head in the course of its movement, means for interlocking the ends of said carton blanks, and means for interfolding the ends of said blank with the edges of said lining, substantially as specified.

29. A machine of the character described comprising an endless moving support, heads carried thereon each adapted to engage a carton blank having foldable interlocking ends, means for shaping said carton blank to said head, means for interlocking the folded ends of said blank, and means for removing the formed carton from said head, substantially as specified.

30. A machine of the character described comprising a frame, a pair of endless traveling belts arranged therein, transverse members connecting said belts, heads secured at their upper ends to said transverse members, means for supporting a carton blank having interlocking ends, and a lining in position to be engaged by the lower free end of one of said heads, means for interfolding the ends of said cartons with the marginal edges of said lining, in the course of its movement, and means for interlocking the ends of said carton and maintaining said lining therein, substantially as specified.

31. A machine of the character described comprising a frame, a pair of vertical, endless traveling belts, transverse members connecting said belts, means for guiding said members in their downward movement, heads carried by said members, a support for holding a carton blank having foldable interlocking ends in position to be engaged by a head in the course of its downward movement, means for folding said blank against said head in the course of its movement, means for interlocking the ends of said carton to hold the same to its form, and means for removing said finished carton from said head, substantially as specified.

32. A machine of the character described comprising a frame, a traveling support therein, heads carried by said support, means for supporting a carton blank to be engaged by said heads, means adapted to engage the bottom end flaps of a carton and fold the same, means adapted to engage the front, and slitted front end flaps and fold the same against the front of said head, and upon the folded bottom end flaps of said blank, means for folding the cover, back and back end flaps against the back of said head and the back end flaps against the slitted front end flaps, means for opening the slits in said front end flaps, means for guiding the tucking tongues on said back end flaps into the slits in said front end flaps, and means for inserting said tucking tongues in said slits, substantially as specified.

33. A machine of the character described comprising a frame, a traveling support therein, heads carried by said support, means for supporting a carton blank to be engaged by said heads, means adapted to engage the bottom end flaps of a carton and fold the same, means adapted to engage the front, and slitted front end flaps and fold the same against the front of said head and the folded bottom end flaps of said blank, means for folding the cover, back and back end flaps against the back of said head and the back end flaps against the slitted front end flaps, means for opening the slits in said front end flaps, means for guiding the tucking tongues on said back end flaps into the slits in said front end flaps, means for inserting said tucking flaps in said slits, and means for removing the finished carton from said head, substantially as specified.

34. In a machine of the character described, a frame, a traveling support therein, heads carried by said support, means for supporting a carton blank to be engaged by said heads, a hinged plate adapted to fold one side member of a carton blank, wing sections pivotally secured to the ends of said plate adapted to fold the end flaps of said side member, means for actuating said hinged plate and wing sections, means for folding the bottom end flaps of a blank upon said folded front end flaps, means for folding the opposite side member of said blank, means for holding said opposite side member against a head, means for folding the end flaps of said opposite side member upon said bottom end flaps, and means for locking the end flaps of said opposite side members together, substantially as specified.

35. In a machine of the character described, a hinged plate, end members pivotally secured thereto, means for actuating said hinged plate, levers pivotally supported upon said hinged plate each having one end pivotally secured to one of said end members, a lever pivotally supported intermediate said first-named levers and having one end pivotally connected to the other ends of said levers, and means for actuating said last-named lever to operate said first-named levers to fold said end members, substantially as specified.

36. In a machine of the character described, means for folding a carton provided at each end with a member having a slit therein, and a member having a tucking tongue, of means adapted to receive the ends of said tongues, and guide the same into position to enter said slits, means for opening said slits, and means for inserting said tucking tongues in said slits to hold the carton locked to its shape, substantially as specified.

37. In a machine of the character described means for folding a carton provided at each end with a member having a slit therein, and a coöperating member having a tucking tongue, of means adapted to receive the ends of said tongues to guide the same into position to enter the slit in its coöperating member, means for distending said slit to receive the end of said tucking tongue, means for inserting the end of said tongue in said slit, and means for driving said tongue home within said slit, substantially as specified.

38. In a machine of the character described means for folding a carton provided at each end with a member having a slit therein, and a coöperating member having a tucking tongue, of means adapted to receive and guide the end of said tucking tongue, means for actuating said guide to bring the end of said tongue into position to enter the slit in its coöperating member, a pivoted member adapted to engage said slitted member to distend the slit therein, a hinged member adapted to engage the portion of the carton blank provided with said tucking tongues, and means for actuating said hinged member to force said tucking tongues completely home within the slits of their coöperating members, substantially as specified.

39. In a machine of the character described, means for folding a carton, provided at each end with a member having a slit therein, and a coöperating member having a tucking tongue, of a pivoted guide adapted to receive and guide the end of said tucking tongue, cam means for actuating said guide to bring the end of said tucking tongue into position to enter the slit in its coöperating member, a pivoted member adapted to engage said slitted member, cam means for distending the slit therein, a hinged plate adapted to engage the portion of the carton blank carrying the members provided with said tucking tongues, and cam means for actuating said hinged member to engage said carton portion and force said tucking flaps completely home within the slits of their coöperating members, substantially as specified.

40. In a machine of the character described, a series of traveling heads, means for forming cartons thereon, a shaft, a gear loosely mounted thereon, a finger secured to said gear adapted to engage an upstanding portion of a carton, a segmental gear adapted to mesh with said gear, means for actuating said segmental gear to operate said gear and cause said finger to remove the cartons from said heads, and spring means for restoring said finger to its initial position after each operation, substantially as specified.

41. In a machine of the character described, a traveling head, means for forming cartons thereon, a shaft, a gear loosely mounted thereon, a finger secured to said gear adapted to engage said cartons, a segmental gear, means for actuating said segmental gear to engage said loose gear intermittently and partly rotate the same, spring means for restoring said loose gear and finger when said loose gear and segmental gear become disengaged from each other, substantially as specified.

42. In a machine of the character described, a traveling head, means for forming cartons thereon, a shaft, a fixed gear and a loose gear mounted thereon, a finger secured to said loose gear, a second shaft, a fixed gear thereon meshing with the fixed gear on said first-mentioned shaft, a segmental gear on said second shaft adapted to mesh with the loose gear on said first-mentioned shaft during a part of each rotation of said segmental gear whereby to actuate said finger periodically, and spring means secured to said finger for restoring the same to its initial position when said segmental gear becomes disengaged from said loose gear, substantially as specified.

Signed at the city of New York, county of New York, and State of New York, this twenty-seventh day of March, nineteen hundred and eight.

FRANK M. PETERS.

Witnesses:
H. H. HUNGERFORD,
CONRAD A. DIETERICH.